Aug. 22, 1950     A. R. HOFFMANN ET AL     2,519,762
GYRODYNAMIC DAMPER

Filed July 9, 1945     2 Sheets-Sheet 1

ANTON R. HOFFMANN
WALTER J. CRUMP
INVENTORS

BY *Gifford J. Holmes*
AGENT

Aug. 22, 1950   A. R. HOFFMANN ET AL   2,519,762
GYRODYNAMIC DAMPER
Filed July 9, 1945                                 2 Sheets-Sheet 2

ANTON R. HOFFMANN
WALTER J. CRUMP
INVENTORS

BY Gifford S. Holmes
AGENT

Patented Aug. 22, 1950

2,519,762

UNITED STATES PATENT OFFICE 2,519,762

GYRODYNAMIC DAMPER

Anton R. Hoffmann, Southport, and Walter J. Crump, Stratford, Conn., assignors to United Aircraft Corporation, East Hartford, Conn., a corporation of Delaware Application July 9, 1945, Serial No. 603,836

1 Claim. (Cl. 170—160.25)

Our invention relates to damping and shock absorbing means for isolating transient vibrations in a helicopter rotor blade, to prevent such vibrations from being transferred through control connections to a pilot operated control member.

An object of this invention is to provide improved means for absorbing vibrations without expending energy from the part damped thereby, by properly phasing, or tuning, the absorber with the vibrations of the part damped.

Another object is to provide a light weight damper to suppress vibrations in a rotor, and/or associated parts to a value below a predetermined desired maximum value for a given operating condition of the craft.

Another object is to provide a pendular damper of the pivoted mass or spring type with the control mechanism of a helicopter, or the like, to suppress and absorb vibrations.

The foregoing and other objects directed to details of construction and arrangement of parts, will be either obvious or pointed out in the following specification and claim.

Figure 1:
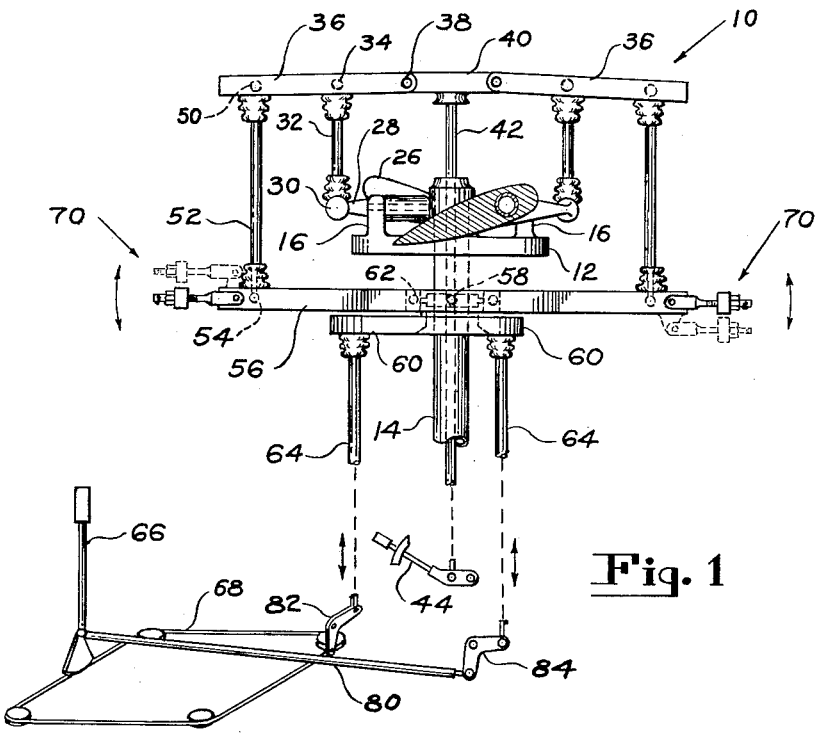
Fig. 1 is a diagrammatic view of a preferred form of our invention.

The control mechanism for a helicopter rotor head to be described below is similar to that shown and described in the application of I. I. Sikorsky, Serial No. 592,862, now U. S. Patent No. 2,517,509.

A rotor head 10 is made up of a plate 12 carried by a shaft 14 turned by an engine, not shown. The plate 12 has upstanding ears 16 that carry drag links 18, Fig. 2. In the modification shown, only two drag links are shown to accommodate two rotor blades, but it will be understood that the damping mechanism of the invention is applicable also to rotors having only one rotor blade or more than two rotor blades. Inasmuch as the connection to each rotor blade is identical with the other, only one will be described.

The drag link 18 is mounted at its inboard end on plate 12 by a horizontal pivot pin and is connected at its outboard end with a stub spar 20 upon which a sleeve 22 mounts a spar 24 carrying a rotor blade 26. The sleeve 22 is mounted upon suitable bearings with the stub shaft 20 so that it can rotate to change the angle of incidence of the blade 26 by following movements of a control horn 28. The control horn 28 is connected by a ball joint 30 to a push-pull rod 32 connected at its upper end by the ball joint 34 to a rocker link 36. The inner end of the rocker link 36 is pivotally connected at 38 to a movable head 40 that can be positioned by a push rod 42 which through a lever 44 controls the total pitch of the rotor blade 26 through the above traced linkage. When the lever 44 is raised, the pivot 38 will be raised to raise the rod 32 and rotate the horn 28 in a clockwise direction as viewed in Fig. 1 to increase the pitch of the rotor blade 26. When the lever 44 is pushed downwardly, the linkage is moved in the opposite sense and the pitch of the blade 26 is decreased. At the same time one or more other rotor blades are controlled similarly through identical linkages connecting them with the total pitch control lever 44.

The outer end of the rocker link 36 is connected by a pivot 50 to a push-pull link 52 connected by a universal pivot 54 to a rotating tilt plate 56 secured on gimbals 58 to the drive shaft 14, and hence rotatable with the shaft 14. The angle that the tilt plate 56 makes with the shaft 14 at any instant is controlled by a pair of arms 60 which are rotatably secured by ball bearings 62 to the plate 56 and non-rotatably secured with respect to the body of the helicopter, not shown. Push-pull rods 64 are controlled by a joy stick 66 through an arrangement shown as comprising a cable 68, a rod 80 and bell cranks 82 and 84 respectively for positioning the arms 60 in accordance with the position of the joy stick 66. It will be understood that the above showing is merely diagrammatic; and in actual practice, the ratio of movement of the stick 66 to tilt the plate 56 through the arms 60 can be in any desired proportion to obtain the proper amount of sensitivity for the control system and provide the proper stability for the craft.

When the rotor blade mechanism described above is in operation, the blades 26 will encounter forwardly moving air and retreating air with respect to the blades as they advance into the wind and retreat with it. After a forward speed determined by aerodynamic characteristics of the craft is attained, cyclic vibrations may occur in the blades which tend to vibrate the control linkage described above and will send vibrations down to the tilt plate 56 and the connecting links 64 to the joy stick 66. We have provided a dynamic damper of the tuned pivoted type mounted at the ends of the extensions on the plate 56 and indicated generally by the reference characters 70. Both of the dampers shown are substantially identical and when more or less rotor blades are used in a rotor structure, the control linkage to each blade will be provided with a damper similar to that now described.

The damper 70 comprises a pair of arms 72 mounted upon a pivot 74 at their inner ends. A weight 76 is provided with holes to fit over the arms 72. The weight 76 is held in place by lock nuts 78 that are in turn secured in place by safety wire 79. The position of weight 76 may be adjusted by turning the lock nuts 78 in or out to move the weight 76 with respect to the pivot 74 to increase or decrease the frequency of vibration of the damper 70.

When the helicopter having the two-bladed rotor mechanism described above moves through the air, the principal objectionable vibration frequency at rod 52 may be on the order of one per revolution or 3 per revolution. The frequency per revolution of this vibration will be a function of the number of blades in the sustaining rotor, based on the formula $n$ plus or minus 1 where $n$ is the number of blades. By properly adjusting the weight 76 upon the arms 72 for any rotor operating speed to obtain a predetermined centrifugal restoring force which would affect the speed of oscillation of the dampers 70 in the same manner as a mechanical spring would affect it at a single frequency, the dampers may be tuned to absorb the vibration tending to vibrate the tilted plate 56. Thus as the force in the push rod 52 moves downward, the dampers 70 will move upward. When the sense of the vibration reverses, the damper which will have started movement due to the first sense of the vibration, will be moved in a direction opposite to the lever and thus absorb the vibration to an extent predetermined by the mass of the dampers 70 and the centrifugal force thereon. The one per revolution vibrations on the joy stick can be compensated for by adjusting the vertical relationship of the pivot points of the damper 70 on swash plate 56 to thus change the mass distribution of this member. The dampers 70 are shown in dotted lines in such positions for this purpose.

Figure 3:
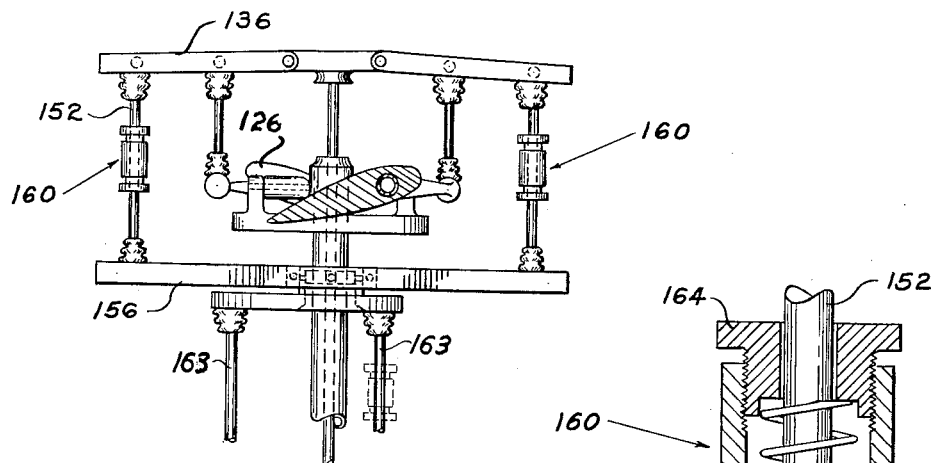
Fig. 3 is a view similar to Fig. 1, but of a modification.

That form of the invention shown in Fig. 3 is fitted to substantially an identical rotor head having a tilt plate 156 and a rocker arm 136 for controlling the pitch of a blade 126. A damper mechanism 160 is shown as mounted upon a push-pull rod 152 pivotally connected to the rocker link 136 and the tilt plate 156. However, this damper will also operate on non-rotating rods, as indicated in dotted lines on a control member 163. The details of construction of the damper 160 are best shown in the sectional view, Fig. 4. The rod 152 has a shoulder 154 secured thereto by a pin 158. A pair of springs 162 abut the shoulders 154 and a pair of lock plugs 164 at their opposite ends. With such construction, any vibration of the shaft 152 will cause the springs 162 to compress and extend respectively against the inertia of the casing of the damper 160. The tension in the springs will cause the outside casing of the damper 160 to move in the same direction as the vibrations. As the vibration reverses, the casing will be moving in an opposite direction to oppose such reversing moment. Thus, inertia of the damper 160 will initially oppose the vibration at its beginning when it is small, and will oppose building up of the vibrations.

The frequency of the device can be adjusted by changing the springs 162 or by changing the mass to vary the period of the damper 160, or a spring rate changing mechanism could be used. Thus, the damper 160 can be tuned to the proper phase for the vibration.

Figure 2:
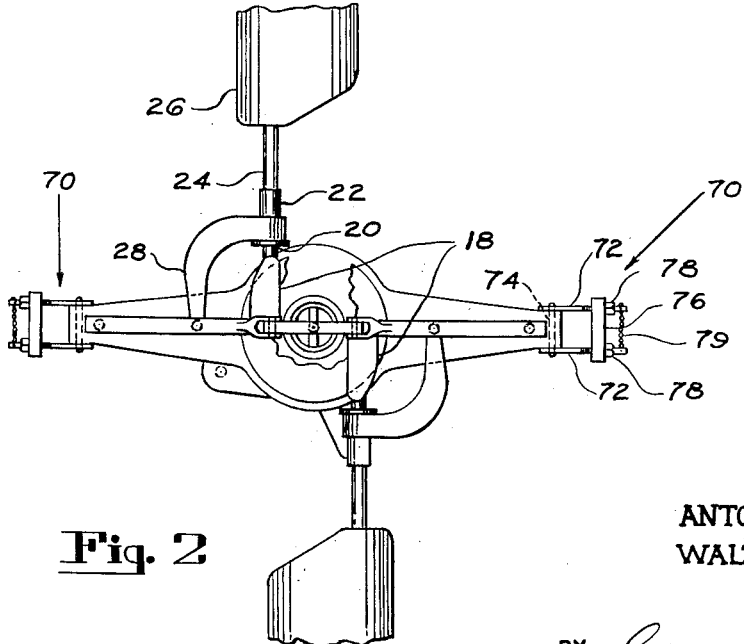
Fig. 2 is a plan view thereof.
Figure 4:
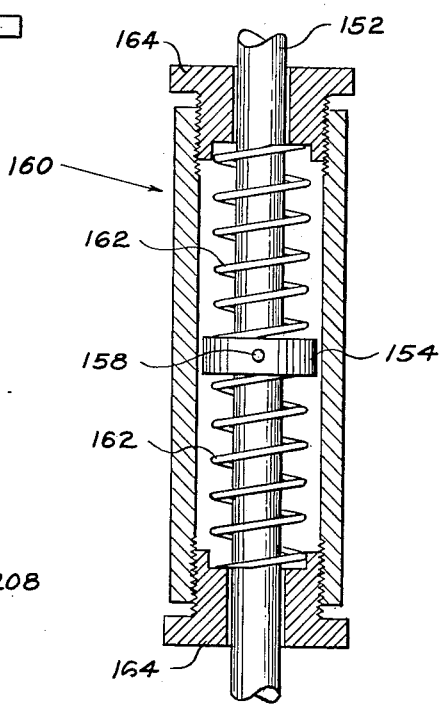
Fig. 4 is a detail view of the spring damper of Fig. 3.

The modification shown in Figs. 3 and 4 is responsive to centrifugal forces in a modified manner from the first modification disclosed in Figs. 1 and 2. In the first modification, the centrifugal forces will be in proportion to the speed of the rotor and the period of vibration of the blades turned by the rotor head 110 will also be in proportion to rotor speed, so the period of vibration of the dampers 170 will substantially correspond to the rotor head speed over wide ranges and will exert a damping action also in proportion to the speed. In the second modification, shown in Figs. 3 and 4, the centrifugal forces will urge the dampers 160 out toward the rods 152. The friction engagement of the plugs 164 against the rods 152 will reduce the period of the damper 160 and provide some Coulomb friction damping for such vibrations. This action can be reversed by pre-loading the mounting so that as the centrifugal force on the damper increases with R. P. M. the frictional forces will be decreased. With the damper 160 mounted on the rod 163 such condition will not obtain, and the damping will be entirely due to the pendulum action of damper 160.

Figure 5:
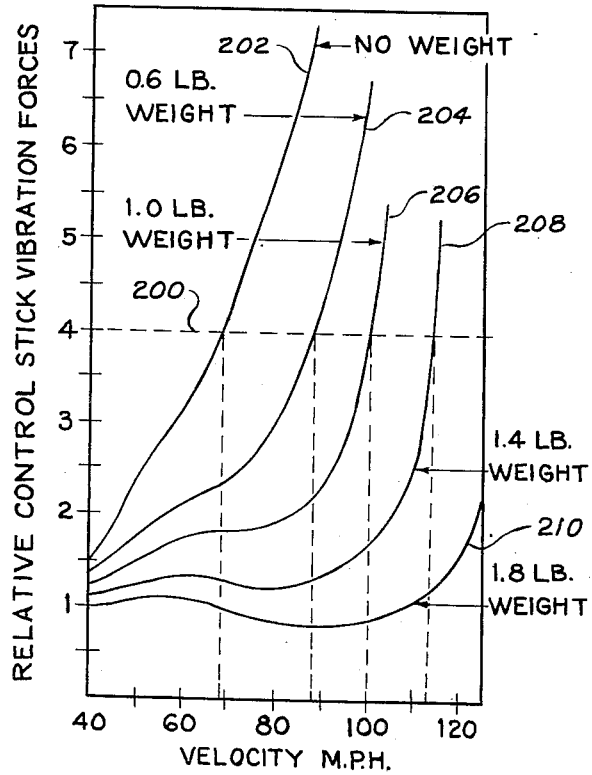
Fig. 5 is a chart illustrating rotor operation with different weight dampers at different speeds.

In Fig. 5 the amplitude of the vibrations of a helicopter rotor provided with different weight dampers is shown charted against the forward velocity of the helicopter. The line 200 represents a point at which the forces due to vibrations pass from below a level which is permissible (not of large enough magnitude to appreciably vibrate connecting linkages into the machine), to above the line 200 in which the vibrations passing to the joystick become tiring to a pilot and of a magnitude that may be dangerous to connecting linkages. A line 202 represents the ratio of the amplitude of the vibrations to the velocity with no weight attached to the control linkage. It will be noted that the vibrations pass across the line 200 at approximately 68 miles per hour velocity for the helicopter. The line 204 represents the characteristics with a .6 pound weight on the connecting linkage to each rotor blade, and this line crosses the line 200 at approximately 88 miles per hour velocity for the helicopter, or substantially 20 miles per hour more than is permissible with no damping means in the control linkage. The line 206 represents the characteristics of the control mechanism with a one pound weight connected in the linkage to each rotor blade and crosses the line 200 at approximately 100 miles per hour velocity for the helicopter. The line 208 represents the characteristics with a 1.4 pound weight and crosses the line 200 at approximately the 112 mile per hour velocity for the helicopter. The line 210 represents the action with a 1.8 pound weight on the control linkage and permits still a greater speed before disturbing vibrations are encountered.

In the selecting of a proper weight for the design conditions of a given machine, it is possible to use a .6 pound weight in any machine that is to operate at a maximum speed of substantially 80 miles per hour and still keep the vibrations in the control system below the desired value represented by the line 200 in the diagram, Fig. 5. As a greater speed is to be attained in any given machine, somewhat more weight is required as indicated by the curves represented by lines 202, 204, 206, 208 and 210 of Fig. 5.

While we have shown and described two forms that our mechanism can take for damping and absorbing the vibrations in the control mechanism to a helicopter rotor blade, it would be obvious to apply the same type damper to other rotary wing craft and to different parts and machine elements associated with such parts for obtaining substantially the same function. For these reasons, we wish not to be limited in our invention only to those forms shown and described but by the scope of the following claim.

We claim:

In a helicopter having a rotor including a hub and blades mounted on said hub for pitch changing movement, control means for cyclically changing the pitch of said blades including a manual control member and a tiltable member operatively connected therewith, said tiltable member having control members connecting it to the several blades, and pendulum damping means for damping the cyclic vibrations transmitted from said blades to said control means comprising a weight pivotally mounted on said tiltable member adjacent the connection of each of said control members thereto including a pair of arms, a pivot for said arms carried by said tiltable member and having an axis at an angle to the axis of said tiltable member, and a weight adjustably mounted on said arms.

ANTON R. HOFFMANN.
WALTER J. CRUMP.

REFERENCES CITED

The following references are of record in the file of this patent:

UNITED STATES PATENTS

| Number | Name | Date |
| --- | --- | --- |
| 1,783,348 | Taylor | Dec. 2, 1930 |
| 1,919,089 | Breguet | July 18, 1933 |
| 2,137,591 | Sarazin | Nov. 22, 1938 |
| 2,225,929 | Sarazin | Dec. 24, 1940 |
| 2,256,635 | Young | Sept. 23, 1941 |
| 2,364,871 | Reissner | Dec. 12, 1944 |